UNITED STATES PATENT OFFICE.

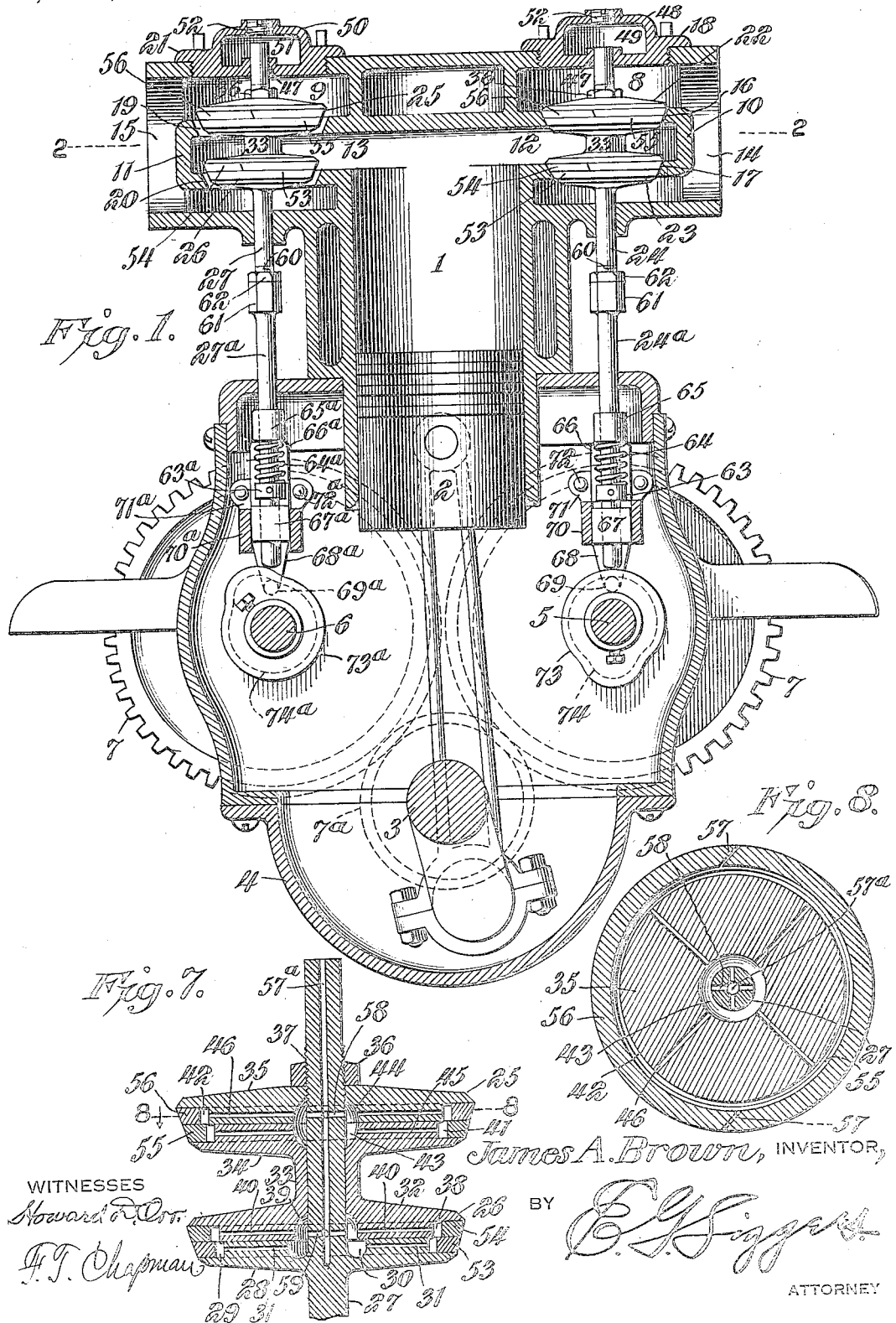

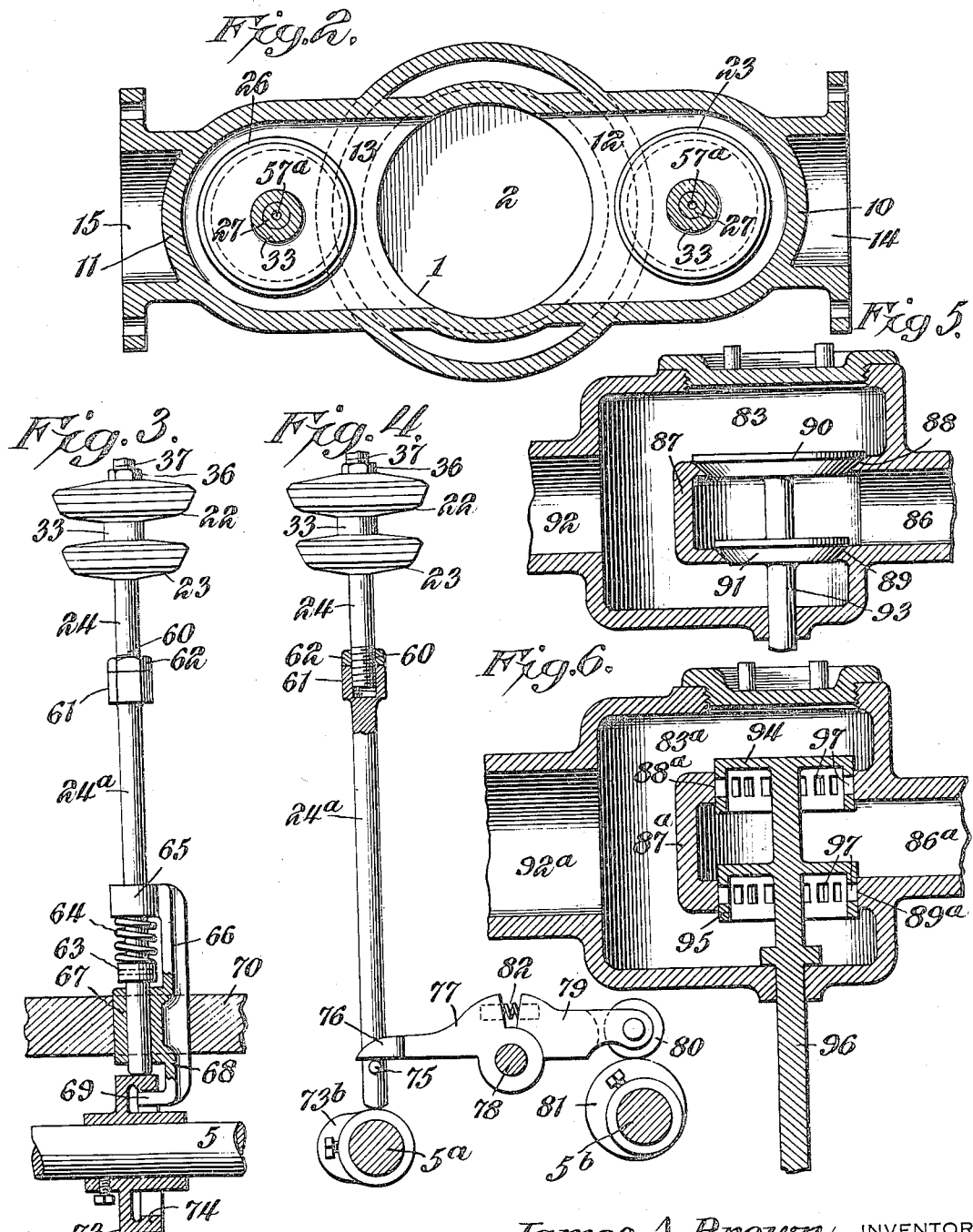

JAMES A. BROWN, OF CEDAR RAPIDS, IOWA.

EXPLOSION-ENGINE VALVE.

1,213,582.                    Specification of Letters Patent.      Patented Jan. 23, 1917.

Application filed March 21, 1914. Serial No. 826,289.

*To all whom it may concern:*

Be it known that I, JAMES A. BROWN, a citizen of the United States, residing at Cedar Rapids, in the county of Linn and State of Iowa, have invented a new and useful Explosion-Engine Valve, of which the following is a specification.

This invention has reference to improvements in valves for explosion engines, and more particularly for automobile or high speed explosion engines.

The object of the invention is to provide a balanced valve producing ample openings or passages for the escapes of gases of combustion and for the intake of fuel, and to permit the valves to open quickly and easily and independently of cylinder pressure. The valves open and close without noise, jar or vibration, and this whether or not there be irregularities in alinement or in other relations of the valves and valve seats.

In accordance with the present invention balanced valves are employed, so that the gases under pressure bear with equal force in opposite directions upon a pair of valves mounted on the same stem, wherefore the amount of power needed to open the valves is only that necessary to overcome the weight of the valves, and the resistance of the bearings of the valve stem. Moreover, the structure permits the use of ports which in their combined area equal or exceed the cross-sectional area of the cylinder, so that there is no back pressure due to constricted passages, nor is there loss of energy due to work imposed upon the engine in opening the valves. The improved valve structure permits the complete elimination of springs for closing the valves and for holding them in the closed position. The valves are so constructed that the seating surfaces are more or less flexible or yielding, wherefore the valves conform to irregularities which would otherwise cause them to imperfectly seat and produce depositions of carbon and scale on the valves and valve seats.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a longitudinal section of an explosion engine embodying the present invention, some parts being shown in elevation. Fig. 2 is a section on the line 2—2 of Fig. 1. Fig. 3 is a view of a valve and its operating mechanism as viewed from a position at right angles to the showing of the same valve in Fig. 1. Fig. 4 is a view of a modified form of the valve operating mechanism. Fig. 5 is a section through a casing containing a balanced valve where the casing is of somewhat different construction from that shown in Fig. 1. Fig. 6 is a view similar to Fig. 5, but showing a still further modification of the form of the balanced valve. Fig. 7 is a longitudinal diametric section through one of the balanced valves drawn on a larger scale than the other figures. Fig. 8 is a section on the line 8—8 of Fig. 7.

Referring to the drawings, there is shown an explosion engine which in the main may be of familiar type, the particular showing being that of an upright engine, although the invention is not limited to such form of engine. In the particular showing of the drawings the engine comprises a cylinder 1, a piston 2, a crank shaft 3, a crank casing 4, cam shafts 5 and 6, gears 7 on the cam shafts, and a gear 7ª on the crank shaft 3 for driving the gears 7. All these parts may follow the customary practice, and so need no particular description as to their operation.

Since the engine is shown as of the upright type all expressions of position will have reference to such type of engine without necessarily restricting the invention thereto.

On top of the cylinder and on opposite sides of the longitudinal axis thereof are valve casings 8 and 9, respectively, the casing 8 being provided with a valve seat web 10 and the casing 9 with a valve seat web 11. The interior of the web 10 communicates with the interior of the cylinder 1 by a passage 12 and the interior of the web 11 communicates with the interior of the cylinder 1 by a similar passage 13, and these passages may, if desired, be each as wide as the diameter of the bore of the cylinder 1. The webs 10 and 11 are arranged intermediately of the respective casings 8 and 9, and the latter have respective openings 14 and 15, the opening 14 being provided for communication with the usual fuel manifold and the opening 15 communicating with the usual exhaust duct.

The web 10 has oppositely disposed valve seats 16 and 17 in alinement and the casing 8 is provided with a cap 18 in alinement with the seats 16 and 17. The web 11 is provided with alined valve seats 19 and 20, respectively, and the casing 9 has a cap 21 in line with the said valve seats. Adapted to the valve seats 16 and 17 are valves 22 and 23 both carried by a valve stem 24. Adapted to the valve seats 19 and 20 are valves 25, 26, carried by a valve stem 27. The valves 22 and 23 are of similar construction, except that the valve 22 is of larger diameter than the valve 23, and the same is true of the valves 25 and 26, respectively, and the seating edges of the valves are of taper form, the valve seats being of like form. This arrangement is provided so that the facing portions of the valves of each pair are of substantially equal area, and the portions of equal area are those presented toward the interior of the cylinder through the respective openings 12 and 13, so that any forces or pressures existing within the cylinder 1 are exerted equally upon both valves of each pair and are there exerted in opposite directions, wherefore the valves if seated have the forces tending to move them in either direction balanced. Consequently any force otherwise exerted upon a pair of valves will move it against the cylinder pressure by the exertion of only so much force as is necessary to overcome the weight of the valves and the resistance of the bearings of the valve stem.

The valves of each pair are of substantially the same construction, and a description of one pair of valves applies to the other, wherefore but one pair of valves will be specifically described, with the understanding that the same description applies to the other. The specific structure of the valves will be best understood by reference to Figs. 7 and 8 in conjunction with Fig. 1.

Formed on the valve stem, and in Figs. 7 and 8 the valve stem 27 with its valves 25 and 26 will be considered, there is formed an axially expanded head or flange 28 having a rabbet or groove 29 at its circumferential margin, while immediately about the stem in what may be termed the upper face of the head 28 there is produced a circular groove 30 surrounding the stem. Extending from this groove 30 into the rabbet 29 are radial passages 31. Resting upon and supported by the head 28 is a top member 32 of disk form extending radially from one end of a sleeve 33 surrounding the valve stem 27 and carrying at the other end another disk like member 34, while bearing upon the upper surface of the disk 34 is another disk 35 surrounding the valve stem 27. The disks 31, 34 and 35 are held against the disk 28 by a nut 36 applied to a threaded part 37 of the valve stem.

The disk 32 has a marginal or peripheral rabbet 38 facing the rabbet 29 and is also formed about the stem 27 with a circular channel or groove 39 communicating with the rabbet 38 by radial passages 40. The disk 34 has a marginal rabbet 41 facing the disk 35 and the latter has a marginal rabbet 42 facing the rabbet 41, and these disks have respective grooves 43 and 44 in their adjoining faces immediately surrounding the stem 27, and the groove 43 communicates with the rabbet 41 by radial passages 45 and the groove 44 communicates with the rabbet 42 by radial passages 46.

The stem 27 is prolonged beyond the nut 36 for a sufficient length to extend through a bearing 47 in the cap or cover 18 or 21, as the case may be. The cover 18 is provided with a crown portion 48 inclosing a chamber 49 and the cap 21 has a crown portion 50 inclosing a chamber 51. Each crown portion 48 and 51 has an opening in its upper face which may be in line with the respective valve stem and is normally closed by a plug 52.

Seated in the rabbet or groove 29 is a packing ring 53 and similar packing rings 54, 55 and 56 are seated in the respective grooves 38, 41 and 42. These packing rings have each an internal diameter somewhat greater than the internal diameter of the respective grooves receiving them, while their outer edges are beveled in conformity with the bevel or taper of the valve seats, and each ring is split as indicated at 57, so that it may have a slight contraction and expansion, while the superior inner diameter of the respective rings permits a slight play or floating of these rings in their grooves in directions perpendicular to the longitudinal axis of the valve stem. The respective under supporting members or disks 28 and 34 of a pair of valves are smaller than the upper or crowning disks 31 and 34 to conform with the taper outer edges of the packing rings, and each upper valve is of greater diameter than the lower valve, so that despite the taper form of the valves the adjacent faces of these valves are of substantially equal area.

Extending lengthwise of each valve stem is a bore 57ª opening at the upper end of the valve where it is lodged within the respective chamber 48 or 51, and extending along the valve stem to a point about coincident with the lower valve, while branch bores 58, 59, respectively, lead from the bore 57 to the channels in each valve immediately surrounding the valve stem.

The chambers 49 and 51 are designed to contain a supply of lubricant, and this lubricant finds its way through the bore 57 and branch bores 58 and 59 into the interior of the respective valves, and from thence by way of the passages 31, 34, 45 and 46 to the channels into which these passages open, thus lubricating the packing rings and permitting their easy accommodation to the seating of the valves whether or not the valves be in exact alinement with each other or with the valve seats, and thereby insuring perfect seating of the valves at all times with the attendant elimination of trouble so often due to accumulations of carbon, scale or both on the valves and valve seats.

For purposes of adjustment each valve stem is formed of two parts, those portions of the valve stems carrying the valves each terminating in a threaded extremity 60 best shown in Fig. 4, while the continuation of the valve stem shown at 24$^a$ or 27$^a$, respectively, has at its upper end a threaded socket 61 for the reception of the threaded end 60 and the latter carries a lock nut 62, whereby the effective length of the valve stem is easily determined.

Each valve stem extension 24$^a$ and 27$^a$ carries like structures, and the description of one will answer for the description of both, and in the drawings the description is confined to the stem extension 24$^a$, while the same parts carried by the stem extension 27$^a$ are designated by the same reference letters with the exponent $a$.

Near what constitutes the lower end of the stem 24$^a$ the latter carries a collar 63 suitably fixed thereto and surrounding this stem and at one end engaging the collar is a spring 64. Supported by the other end of the spring is a sleeve 65 connected by a yoke 66 to another sleeve 67 surrounding the stem 24$^a$ between the collar 63 and the lower end of the stem, and from the collar 67 there is a yoke extension 68 terminating in a finger 69 spaced from the lower end of the stem 24$^a$. The sleeve 67 is movable in a supporting member 70 extending to the sides of the crank casing and connected thereto through the intermediary of suitable brackets or ears 71 and fastening devices 72 securing the ears to the walls of the casing.

Mounted on the cam shaft 5 is a cam 73, and a similar cam 73$^a$ is mounted on the cam shaft 6. The outer face of each cam is engaged by the lower end of the respective valve stem extension 24$^a$ or 27$^a$, as the case may be, and this cam has an interior flange 74 or 74$^a$ as the case may be, engaged by the finger 69 or 69$^a$, the lower end of the valve stem and the finger being held in engagement with the respective inner and outer cam surfaces by the spring 64 or 64$^a$ as the case may be.

In Fig. 4 there is indicated a somewhat different valve operating means from that shown in Figs. 1 and 3, and Fig. 4 may be taken as indicative of the valves 22 and 23 with the adjustable stem 24, 24$^a$. In this case, however, the valve stem extension 24$^a$ at its lower end is engaged directly by a cam 73$^b$ located on a cam shaft 5$^a$, and near the lower end the valve stem extension 24$^a$ is provided with a transverse pin 75 engaged by a fork 76 straddling the stem extension 24$^a$ and formed on one end of a rock arm 77 mounted on a pivot 78 which in turn may be carried by any suitable fixed portion of the engine structure. Also mounted on the pivot pin 78 is another rock arm 79 projecting oppositely from the rock arm 77 and at its free end carrying a roller 80 in the path of a cam 81 on another cam shaft 5$^b$. A spring 82 interposed between the two rock arms tends constantly to rock these arms in opposite directions, so that the fork 76 is maintained in engagement with the pin 75 and the roller 80 is maintained in engagement with the cam 81. The spring 82 serves as an elastic buffer in a manner similar to the spring 64 of the structure of Fig. 3. The cam 73$^b$ operates to open the valve, while the cam 81 through the rock arms 79 and 76 with interposed spring buffer 82 tends to close the valve and maintain it with suitable elastic pressure in its seat. The structure of Fig. 4 may be employed with either or both of the inlet and exhaust valves.

In Fig. 5 there is shown a valve chamber 83 which may be indicative of either the valve chambers 8 or 9 and is of considerably larger capacity than such valve chambers. This valve chamber has an inlet 86 which may represent either inlet 12 or 13, and also with a web 87 provided with ports 88, 89 for balanced valves 90, 91, respectively, operating in the same manner as either set of balanced valves of the structure of Fig. 1. The chamber 83 is also provided with an outlet 92. The valves 90 and 91 are carried by a valve stem 93.

In Fig. 6 there is shown a chamber 83$^a$ provided with an inlet passage 86$^a$ and an outlet passage 92$^a$ with a ported web 87$^a$ having ports 88$^a$ and 89$^a$ of equal size, these ports having therein piston valves 94, 95, respectively, carried by a stem 96 and formed with numerous passages 97, so that the valves may be moved to the open position without fully leaving the ports. The valves of Fig. 6 are balanced like those of the other structures.

In Fig. 1 the piston is starting on the scavenging stroke and the balanced valves 25 and 26 are opening, only such resistance being offered to the opening movement as is due to the weight of the valves and the friction of their bearings, all of which is negligible. The valves are opened positively and closed positively and even though the valve seats be slightly out of alinement or there be other similar causes which would ordinarily prevent the valves from properly seating, the flexibility or floating relation of the seating portions of the valves causes them to automatically accommodate themselves to any irregularities, wherefore the valves will even under adverse circumstances properly seat, thereby to such extent aiding in the prevention of carbon deposits or the deposition of scale and the engine therefore runs with high efficiency under conditions which prevent such a degree of efficiency in ordinary valve structures.

The balanced valves are particularly valuable in connection with the exhaust side of the engine where the valves are subjected to harder service than on the inlet side because of the passage through them of hot gases of combustion.

What I claim is:—

1. An explosion engine provided with a pair of adjacent inlet ports and a pair of adjacent exhaust ports, a balanced valve structure for each pair of ports having yieldable marginal portions where engaging the ports, and adapted to yield in a direction perpendicular to the direction of movement of the valve structure, and means for positively opening and closing each balanced valve structure.

2. An explosion engine provided with a passage communicating with the explosion chamber and having a pair of associated alined ports leading therefrom, a balanced valve for the ports, and operating means for the valve for positively moving it in both directions and including elastic means for cushioning the closing movement of the valve, said valve being provided with marginal packing members yieldable in a direction perpendicular to the closing movement of the valve and coacting with the cushioning means to yieldably and accurately seat the valve.

3. An explosion engine provided with a conduit for gases communicating with the interior of the cylinder of the engine and including a pair of adjacent alined tapering ports each constituting a valve seat, and a valve structure comprising connected tapering valves each connected to a respective one of the valve seats with the faces toward the engine cylinder of substantially equal area, and the margins of the valves toward the seats being provided with floating seating edges movable in directions perpendicular to the closing movement of the valve structure.

4. In an explosion engine, balanced valves movable to the open and closed positions and each provided with floating engaging margins for the ports controlled by the valves, said floating margins being movable with respect to the valves in directions substantially perpendicular to the opening and closing movements of said valves.

5. In an explosion engine, a balanced valve having a port engaging portion consisting of packing rings mounted for bodily movement in planes substantially perpendicular to the direction of movement of the valve in opening and closing.

6. In an explosion engine, a balanced valve having a marginal seating portion composed of a plurality of packing rings each mounted for bodily movement in a plane perpendicular to the direction of movement of the valve in opening and closing.

7. In an explosion engine, a balanced valve consisting of two valve members joined together for common movement and each provided at its marginal portion with a plurality of packing rings yieldable to pressure and movable bodily thereunder in a plane perpendicular to the direction of movement of the valve in opening and closing.

8. In an explosion engine, a balanced valve structure having the marginal portions of the valves formed of packing rings with the valves carried by a valve stem, the valve stem and valves being provided with communicating ducts leading to the packing rings for the conveyance of lubricant thereto.

9. In an explosion engine, a balanced valve structure comprising a valve stem carrying a plurality of pairs of disks, each pair of disks forming a valve and the pairs being separated in the direction of the length of the valve stem, each disk having a marginal groove, a packing ring mounted in the groove and movable therein in a plane perpendicular to the length of the valve stem, and said valve stem and disks having communicating ducts for the conveyance of lubricant through the valve stem to the packing rings.

10. In an explosion engine, a balanced valve structure comprising a valve stem carrying a plurality of pairs of disks, each pair of disks forming a valve and the pairs being separated in the direction of the length of the valve stem, each disk having a marginal groove, a packing ring mounted in the groove and movable therein in a plane perpendicular to the length of the valve stem, and said valve stem and disks having communicating ducts for the conveyance of lubricant through the valve stem to the packing rings, there also being provided a lubricant chamber with which the valve stem communicates for supplying the duct therein with lubricant.

11. In an explosion engine, a balanced valve structure comprising a valve stem and a pair of valves thereon spaced apart in the direction of the length of the stem with the adjacent faces of the valves of substantially equal area and each valve being marginally recessed and provided with packing rings lodged in the recesses and movable in said recesses each in a plane substantially perpendicular to the direction of movement of the valve structure in opening and closing.

12. In an explosion engine, a balanced valve structure comprising a valve stem, and valves thereon spaced apart in the direction of the length of the stem and having their adjacent faces of substantially equal area, each valve having a marginal circumferential recess with packing rings lodged in the recess, the marginal portions of the valves and the outer edges of the packing rings lodged therein being all tapered in one direction.

13. In an explosion engine, a balanced valve comprising a valve stem with valves thereon formed of opposed disks each with a marginal groove, the valves being spaced apart lengthwise of the valve stem and the adjacent disks of the two valves being of substantially equal area, each disk being marginally grooved and there carrying a packing ring and the valve stem and disks having communicating ducts for conveying lubricant to the packing rings.

14. In an explosion engine, a balanced valve comprising a valve stem with valves thereon formed of opposed disks each with a marginal groove, the valves being spaced apart lengthwise of the valve stem and the adjacent disks of the two valves being of substantially equal area, each disk being marginally grooved and there carrying a packing ring and the valve stem and disks having communicating ducts for conveying lubricant to the packing rings, each ring being split and mounted in its respective groove for movements therein in a plane substantially perpendicular to the length of the valve stem.

In testimony, that I claim the foregoing as my own, I have hereto affixed my signature in the presence of two witnesses.

JAMES A. BROWN.

Witnesses:
WILLIAM G. LOFTUS,
HARRY C. STUSAK.